United States Patent [19]

Frese et al.

[11] 3,968,397

[45] July 6, 1976

[54] FIRING APPARATUS FOR A PLURALITY OF ELECTRIC VALVES

[75] Inventors: Stefan Frese, Vienna; Franz Mayerhofer, Modling, both of Austria

[73] Assignee: Siemens Aktiengesellschaft, Munich, Germany

[22] Filed: Dec. 5, 1974

[21] Appl. No.: 529,722

[30] Foreign Application Priority Data

Dec. 5, 1973  Germany............................ 2360653

[52] U.S. Cl................................ 315/155; 250/209; 250/216; 307/311
[51] Int. Cl.²..................... H05B 37/02; E04G 17/06
[58] Field of Search .......... 250/228, 575, 577, 578; 307/311; 315/155; 250/216

[56] References Cited
UNITED STATES PATENTS 3,134,906  5/1964  Hencker .......................... 250/228 X
3,567,972  3/1971  Faust .................................. 307/311

Primary Examiner—R. V. Rolinec
Assistant Examiner—Lawrence J. Dahl
Attorney, Agent, or Firm—Kenyon & Kenyon Reilly Carr & Chapin

[57] ABSTRACT

The invention concerns a firing device for a number of electric valves, particularly thyristors. Each thyristor control path is associated with a firing circuit with a detector for electromagnetic radiation responsive to a transmitter which is controlled by a firing control signal and is equipped with a radiating device which energizes the individual detectors. To transmit the firing control signal with sufficient strength, a transmitter with a radiator is provided which is arranged in the focal line of a reflector designed as a partial elliptical cylinder. The individual detectors are disposed in a line which is aligned essentially parallel to the focal line of the reflector.

11 Claims, 2 Drawing Figures

FIRING APPARATUS FOR A PLURALITY OF ELECTRIC VALVES

BACKGROUND OF THE INVENTION

1. Field of the Invention

The invention concerns a firing device for a plurality of electric valves, especially thyristors, with each of whose control paths a firing circuit with a detector for electromagnetic radiation is associated with a transmitter which is controlled by a firing control signal and is equipped with a radiator which energizes the individual detectors.

2. Description of the Prior Art

It is known (German Patent No. 1,538,099) to use, for firing an electric valve, particularly a thyristor, a firing circuit which derives the firing energy from the voltage at the anode-cathode path of the valve in question. In this arrangement, a pulse capacitor is used which is charged up by means of this voltage and is discharged, when required, onto the control path of the valve via a switching element. As the switching element, a light-controlled thyristor, in particular, is used, which can be fired by light irradiation from a light source placed some distance away. In this manner, electric potential differences which exist between the light source as the transmitter of electromagnetic radiation and the electric valve, have no effect on the firing. Such a firing circuit will therefore be used preferably for the firing of electric valves for high voltage, particularly of high-voltage thyristors that are used in a rectifier arrangement.

Another possibility of transmitting a firing control signal from a transmitter for electromagnetic radiation to a firing circuit, which is equipped with a detector for this electromagnetic radiation, is described in Swiss Pat. No. 413,993. High-frequency radiation is used here as the electromagnetic radiation. The firing of one or several valves via a high-frequency transmission path is largely free of interference and is suitable particularly for the firing of thyristors which are used in rectifiers in high-voltage d-c transmission systems.

It is an object of the present invention to let the largest possible share of the electromagnetic radiation emitted by the transmitter arrive at the detector, so that in the presence of a firing command a sufficiently large input signal is applied to the firing circuit.

SUMMARY OF THE INVENTION

According to the invention, this object is met by providing the transmitter with a radiator which is arranged in the focal line of a reflector designed as a partial elliptical cylinder, and by arranging the individual detectors in a line which is aligned essentially parallel to the focal line of the reflector.

This arrangement brings about a sharp focusing of the electromagnetic radiation emitted by the radiator in the direction toward the individual detectors which are associated with the firing circuits. This arrangement assures that a large share of the radiation emitted by the transmitter arrives via the transmission path at the detectors, which are arranged at some distance. The firing pulse information received is then sufficient for interference-proof firing of the individual valves. If in this connection, firing circuits are used which receive their energy from the anode-cathode voltage of the electric valve, they can be laid out for less firing energy. At the same time, the reaction of the firing circuits on the circuit in which the valves are arranged decreases.

A further advantage of this arrangement is seen in the fact that less transmitter power is necessary than in known arrangements and/or that the transmission path between the transmitter and the detectors can be chosen longer.

Light in the visible range of the spectrum can be provided here as the electromagnetic radiation. The transmitter can then be, for instance, an incandescent lamp or a light-emitting diode. Photoresistors, phototransistors or photothyristors are suitable as detectors. If smoke or fog can get into the transmission path, it is advisable to provide infrared light as the electromagnetic radiation. Also UV light can be used. For applications where a dust-free transmission path is not assured, high-frequency radiation may also be provided in preference as the electromagnetic radiation. The latter may, for instance, be in the GHz range.

The radiator will be arranged preferably in the center of the focal line of the reflector. The radiator may be designed here in the form of a rod; the axis of its maximum radiation, which need not coincide with the rod axis, should then point at right angles to the direction of the focal line of the reflector. however, the radiator may also be a point source.

The electric valves may be combined in a valve stack whose stack axis is aligned parallel to the line of the individual detectors. This permits a particularly simple design with short connecting lines.

A further preferred embodiment of the arrangement according to the invention is distinguished by the feature that the line of the individual detectors is arranged in the second focal line of the elliptical reflector. This permits optimum transmission of energy.

DESCRIPTION OF THE INVENTION

Figure 1:
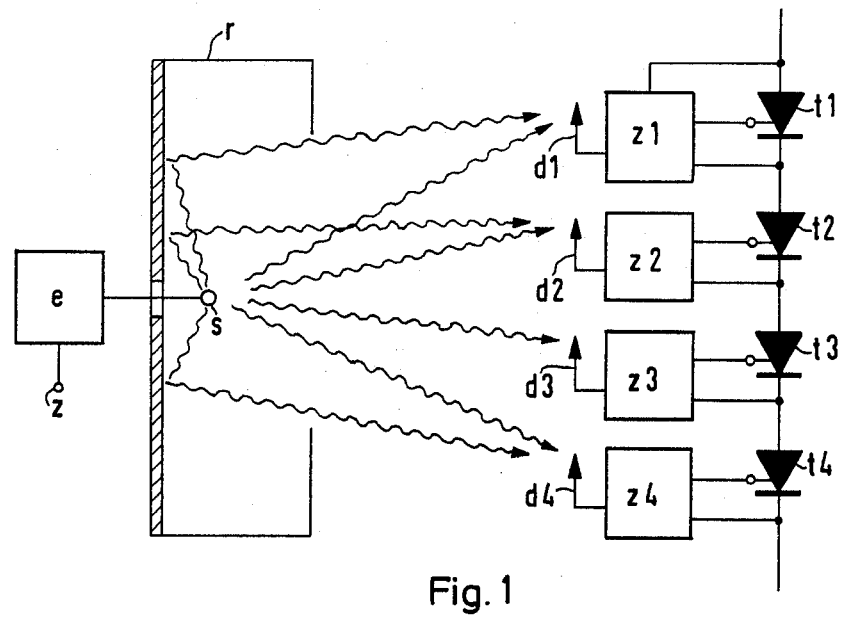
FIG. 1 shows an arrangement for firing a number of electric valves, comprising a transmitter with a reflector which is shown in cross section.
Figure 2:
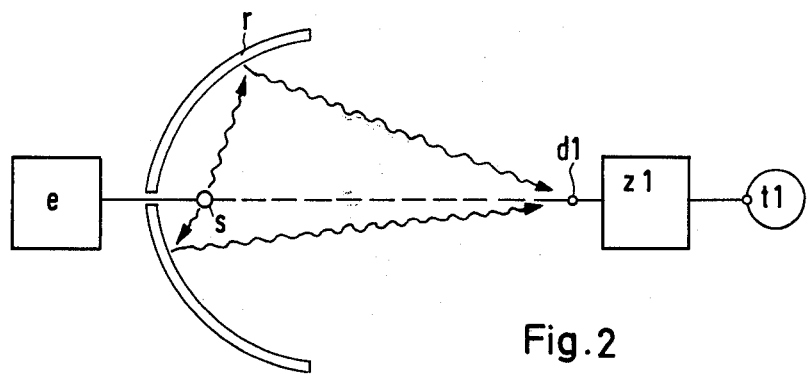
FIG. 2 shows the arrangement according to FIG. 1 in a view from the top onto the reflector designed in the shape of an ellipse.

In FIGS. 1 and 2, an arrangement for firing a number of electric valves $t1$, $t2$, $t3$ and $t4$ is shown schematically. These valves $t1$ to $t4$ may, in particular, be thyristors. They are connected in series with each other. The series circuit shown may be part of a rectifier for a high-voltage d-c transmission system. The individual valves $t1$ to $t4$ may be stacked together with the interposition of heat sinks (not shown). The axis of the stack is preferably vertical, so that FIG. 1 constitutes a side view of the stack arrangement.

For firing the valves $t1$ to $t4$, a firing control signal $z$ is provided, which is formed, for instance, in a control circuit for keeping the voltage or the frequency of the rectifier constant. This firing control signal $z$ is fed to a transmitter $e$, which is provided with a radiating head or radiator $s$. The transmitter $e$ may be, for instance, a voltage source that can be switched on and off by the firing control signal $z$, and the radiator $s$ may be an incandescent lamp or a light-emitting diode. The transmitter $e$ may also be a high-frequency transmitter which emits high-frequency radiation, e.g., with a frequency of 2.4 GHz, via a high-frequency antenna used as the radiator $s$. The radiator $s$ is designed as a point source in the present case. The electromagnetic radiation emitted may be in the visible range of the spectrum, in the infrared spectral region, in the UV spectral region or in the high-frequency spectral region.

As can be seen from FIGS. 1 and 2, the radiator $s$ is arranged inside a reflector $r$. This reflector $r$ is designed as a partial elliptical cylinder. This may be a metallic mirror. The arrangement is made so that the radiator $s$ is arranged in the first focal line of the partial elliptical cylinder. It is situated approximately in the center of this first focal line of the reflector $r$. This arrangement assures that a large part of the energy delivered by the transmitter $e$ is concentrated or focussed as electromagnetic radiation, onto the second focal line of the reflector $r$. In FIG. 2, the two focal lines are normal to the plane of the paper.

At some distance from the radiator $s$, a number of detectors $d1$, $d2$, $d3$ and $d4$ are arranged. These detectors $d1$ to $d4$ are capable of capturing the electromagnetic radiation emitted by the radiator $s$ and of passing on a signal to a respective, succeeding firing circuit $z1$, $z2$, $z3$ or $z4$. The individual detectors $d1$ to $d4$ are arranged along a straight line. This line is oriented essentially parallel to the first focal line near the reflector. The arrangement is made so that the line of the individual detectors $d1$ to $d4$ coincides exactly with the second focal line of the reflector $r$. It is assured thereby that the electromagnetic radiation emitted by the transmitter $s$ is focussed onto the surface of the detectors $d1$ to $d4$ via the transmission path. As can be seen from FIG. 2, the arrangement of the radiator $s$, the reflector $r$ and the detectors $d1$ to $d4$ is symmetrical. Because the electromagnetic radiation is focussed, low transmitter power is sufficient even for a fairly long transmission path.

To avoid interference and external stray effects, it is advisable to arrange the individual firing circuits $z1$ to $z4$ in the immediate vicinity of the valves $t1$ to $t4$. This requirement can be met particularly if the stacking axis of the valves $t1$ to $t4$ is aligned parallel to the line of the individual detectors $t1$ to $t4$.

If light is used as the electromagnetic radiation, the detectors $d1$ to $d4$ may be phototransistors of photothyristors. As the firing circuit $z1$ to $z4$, one can use one which obtains its firing energy from the anode-cathode voltage of the valve $t1$ to $t4$ in question. In order to illustrate schematically in FIG. 1, how the firing energy is obtained from this anode-cathode voltage, an electrical connection is shown there between the anode of the valve $t1$ and the firing circuit $z1$. The connection to the cathode is already shown for the transmission of the firing pulses.

If high-frequency radiation is provided as the electromagnetic radiation, the detectors $d1$ to $d4$ are designed as antennas. The inside surface of the reflector $r$ trained onto the detectors $d1$ to $d4$ should then be metallic. The entire reflector $r$ is then either designed as a metal mirror or its inside surface is covered with a metallic layer. The individual firing circuits $z1$ to $z4$, then contain also a high-frequency receiving circuit, which can evaluate the firing control signal delivered via the transmission path and convert it into a firing control command for the firing circuit $z1$ to $z4$.

The arrangement shown in FIGS. 1 and 2 is used for firing a series circuit of valves $t1$ to $t4$. These valves $t1$ to $t4$ are to be fired simultaneously. Deviating therefrom, the arrangement shown of the components $r$, $s$ and $d1$ to $d4$ can also be used if the individual valves $t1$ to $t4$ belong to different branches of the rectifier and are therefore fired at different points in time.

What is claimed is:

1. An apparatus for the simultaneous firing of a plurality of controllable semi-conductor rectifiers in a current rectifier for high voltages including a transmitter for electromagnetic radiation having radiating means and a reflector and a detector for each of the plurality of semi-conductor rectifiers, the individual detectors coupled to the firing circuits of their associated semi-conductor rectifiers, the improvement comprising:
   a. a reflector in the form of an elliptical partial cylinder;
   b. the radiator positioned at the first focus line of the elipse of said elliptical cylinder; and
   c. the plurality of detectors positioned at the second focus line of said elipse.

2. The apparatus of claim 1 wherein the reflector has a metallic surface.

3. The apparatus of claim 1 wherein the radiator is positioned in the center of the focal line of the reflector.

4. The apparatus of claim 1 wherein said radiator is a rod having its axis of maximum radiation pointing at right angles to the focal line of the reflector.

5. The apparatus of claim 1 wherein said radiator is a point source.

6. The apparatus of claim 1 wherein said valves are arranged in a valve stack, the axis of which is aligned in parallel to the line of the individual detectors.

7. The apparatus of claim 1 wherein visible light is provided as the electromagnetic radiation.

8. The apparatus of claim 1 wherein infrared light is provided as the electromagnetic radiation.

9. The apparatus of claim 1 wherein UV light is provided as the electromagnetic radiation.

10. The apparatus of claim 1 wherein high-frequency radiation is provided as the electromagnetic radiation.

11. The apparatus of claim 10 wherein the high-frequency radiation is in the GHz range.

* * * * *